Figure 1:
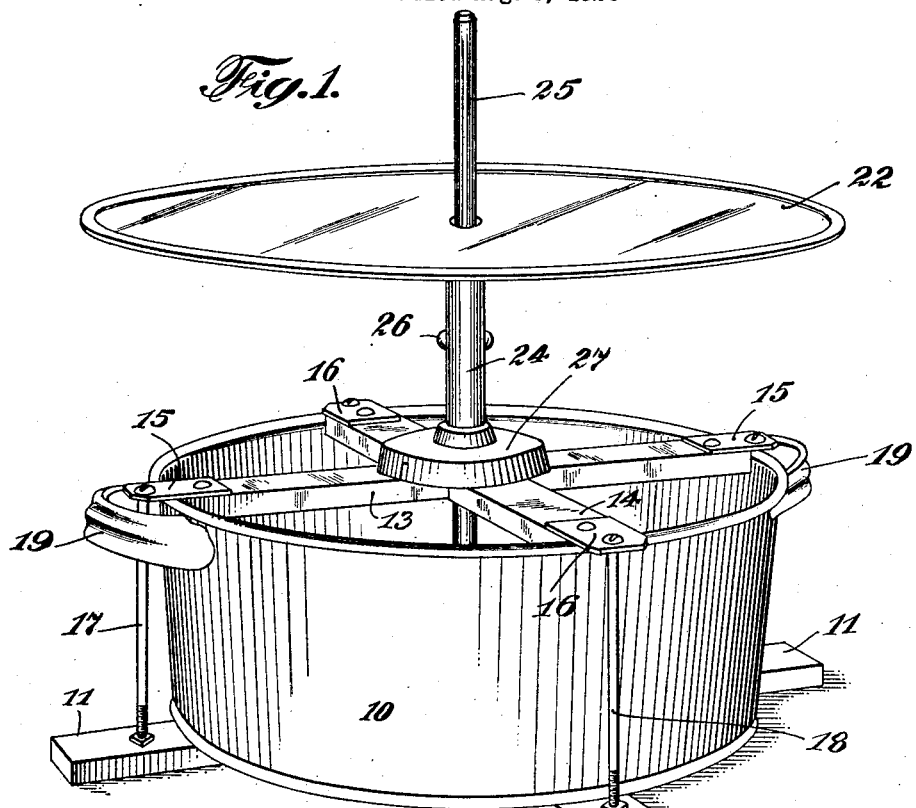

March 31, 1925.                                                    1,531,842
F. W. CARPENTER
FEED HOLDER
Filed Aug. 1, 1924

INVENTOR
Francis W. Carpenter
BY
ATTORNEYS

Patented Mar. 31, 1925.

1,531,842

UNITED STATES PATENT OFFICE.

FRANCIS W. CARPENTER, OF GREENWICH, CONNECTICUT.

FEED HOLDER.

Application filed August 1, 1924. Serial No. 729,432.

*To all whom it may concern:*

Be it known that I, FRANCIS W. CARPENTER, a citizen of the United States, residing at Greenwich, in the county of Fairfield and State of Connecticut, have invented an Improvement in Feed Holders, of which the following is a specification.

My present invention relates to a feed trough or feed holder for poultry, and particularly to that type of device shown and described in Letters Patent No. 1,329,288 granted to me January 27, 1920, in which the receptacle employed to hold the food or drink is provided with a base which makes it impossible for the poultry to upset or overturn the holder. My present invention, however, is not specifically limited to this type of feed holder as the same may be employed with other forms of feed holders. In carrying out my present invention the feed holder irrespective of the particular type of receptacle and base upon which the same may be supported consists in the application of a cover preferably reversible and adapted in one position to be supported appreciably above the top or open end of the receptacle and when in this position to provide ample space for the poultry to feed or drink therefrom but not to enter the same and when in the other position to lie closely upon the top of the receptacle to close the same to prevent rats and other vermin from obtaining access thereto and to feed contained therein. It will be understood that the cover is of sufficient extent to protect the food or drink in the receptacle from the rain irrespective of the position in which the cover may be placed.

Figure 2:
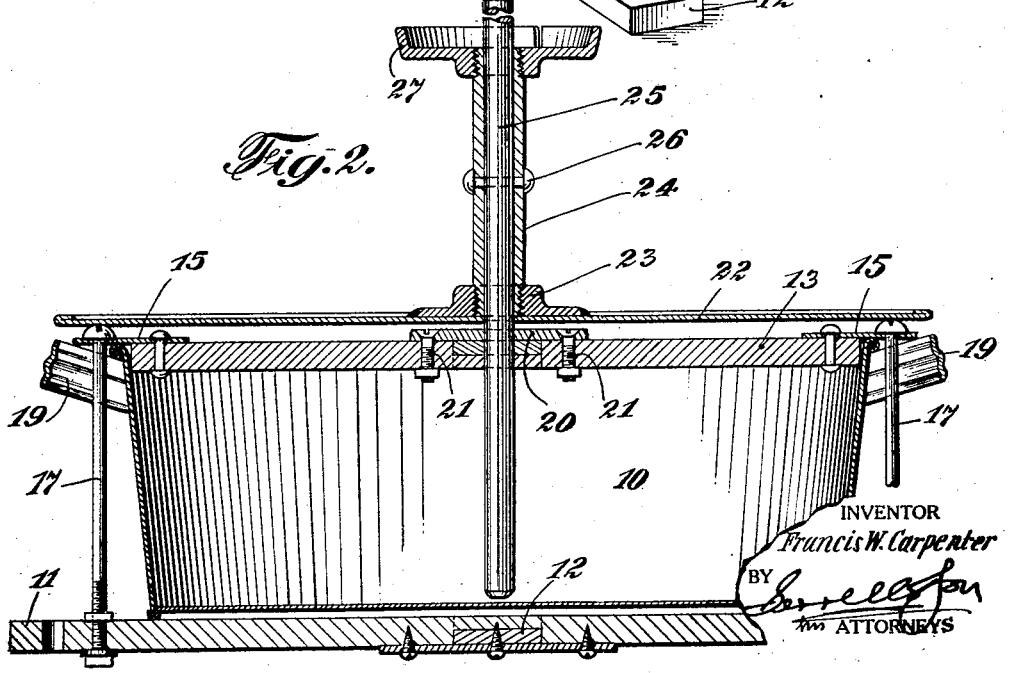

In the drawing:

Fig. 1 is a perspective view illustrating the feed trough made in accordance with my present invention, and Fig. 2 is a transverse section of the same.

Referring to the drawing, it will be seen that in carrying out my present invention the feed holder or trough made in accordance therewith comprises a suitable receptacle 10 which may be of any suitable size and configuration. The receptacle is preferably mounted upon cross bar supports 11 and 12 and is secured thereto by transverse arms 13 and 14 adapted to fit within the upper end of the receptacle and provided with brackets 15, 16 respectively by which the cross arms are connected to the supports by bolts 17, 18 or otherwise. Also as indicated the receptacle may be provided with oppositely disposed handles 19.

The cross arms may be secured to each other in any suitable manner and in a centrally disposed position are provided with a bearing plate 20. As illustrated this may be secured in place by screw bolts 21. Any suitable means, however, may be employed for this purpose.

As hereinbefore stated my present invention relates more particularly to the application and use of a reversible cover for a feed trough of the type indicated and for the purposes specified. To this end I employ a disk 22 as a cover member. This may be made of sheet metal or other suitable material and of a configuration to conform to the receptacle and of an extent amply sufficient or slightly more than sufficient to extend over the same. The disk 22 is provided with a hub 23 which may be secured thereto in any suitable manner in a centrally disposed position. Secured to the hub 23 is a sleeve 24, and fixed in the sleeve 24 is a spindle 25. The spindle is preferably fixed in the sleeve and as illustrated a rivet or similar device 26 may be employed for this purpose. At the opposite end of the sleeve the same is fitted with a socket 27.

In the drawing the reversible cover is shown in one position in Fig. 1 and in the other position in Fig. 2. With the cover in its open or elevated position as shown in Fig. 1 the socket member 27 is adapted to fit over the bearing plate 20 to maintain the parts in place and the disk or cover in a position sufficiently spaced from the upper open end of the receptacle to permit the poultry to feed and drink therefrom without entering the same, this end of the spindle being sufficiently long to extend into the receptacle passing through the bearing plate and also through the apertures provided for this purpose in the cross arms 13 and 14. In the other position as shown in Fig. 2 the position of the disk or cover is reversed and lies closely against the upper end of the receptacle sufficiently close in any event to prevent rats, mice or other vermin from entering the receptacle and destroying or consuming the feed therein. It will also be apparent that in both positions the cover or disk 22 is of sufficient extent to protect the feed in the receptacle from the weather.

It is to be understood that while I have hereinbefore shown and described the cover device for the feed trough as adjustable to different positions by reversing the same, that is by inserting opposite ends of the spindle into the bearing carried by the support or cross bars, the cover member may be shiftable from the position in which it closes the receptacle to the position in which it is supported above the receptacle sufficiently far to permit poultry to feed from the receptacle and of course to be moved in the opposite direction by simply shifting the spindle or other member upon which the cover is mounted from one position to another in the bearing in which the spindle operates, or obviously the cover member may be shiftable to position on the spindle itself which in such a structure may be fixed in its support.

I claim as my invention:

1. A feed holder for poultry comprising a receptacle, a reversible cover therefor, and means for supporting the cover in either reversible position in one of which the cover closes the receptacle making the interior thereof inaccessible and in the other the cover is spaced sufficiently above the receptacle to make the interior of the same accessible for the poultry to feed therefrom.

2. A feed holder for poultry comprising a receptacle, a reversible cover therefor, means associated with the receptacle for supporting the cover in either of its positions, and devices associated with the cover and coacting with the aforesaid supporting means for maintaining the cover in either of its reversible positions, in one of which it closes the receptacle and in the other of which it is spaced sufficiently above the receptacle to permit poultry to feed therefrom.

3. A feed holder for poultry comprising a receptacle having an upper open end, a reversible cover, a support member in the upper open end of the receptacle, and means associated with the cover and coacting with the said support for maintaining the cover in either of its reversible positions in one of which it closes the receptacle and in the other it is spaced sufficiently above the receptacle to permit poultry to feed therefrom.

4. A feed holder for poultry comprising a receptacle having an upper open end, a reversible cover, cross arms at the upper open end of the receptacle and having a centrally disposed bearing therein, a spindle to which the cover is connected and which is adapted to extend through the said bearing to permit the cover to assume a position for closing the receptacle, and devices associated with the cover and the said spindle for maintaining the cover when reversed in a position in which it is spaced sufficiently above the receptacle to permit poultry to feed therefrom.

5. A feed holder for poultry comprising a receptacle having an upper open end, a reversible cover, cross arms at the upper open end of the receptacle and having a centrally disposed bearing therein, a spindle to which the cover is connected and which is adapted to extend through the said bearing to permit the cover to assume a position for closing the receptacle, and a sleeve and socket member associated with the spindle whereby the cover in its reversed position is maintained sufficiently above the open end of the receptacle to permit poultry to feed therefrom.

Signed by me this 28th day of July, 1924.

FRANCIS W. CARPENTER.